United States Patent
Park et al.

(10) Patent No.: US 12,523,764 B2
(45) Date of Patent: Jan. 13, 2026

(54) RADAR DEVICE FOR VEHICLE AND CONTROL METHOD THEREOF

(71) Applicant: HL Klemove Corp., Incheon (KR)

(72) Inventors: Jong Gyu Park, Yongin-si (KR); Hanyeol Yu, Suwon-si (KR); Hyeon Dong Cho, Seongnam-si (KR)

(73) Assignee: HL KLEMOVE CORP., Incheon (KR)

(*) Notice: Subject to any disclaimer, the term of this patent is extended or adjusted under 35 U.S.C. 154(b) by 515 days.

(21) Appl. No.: 17/869,026

(22) Filed: Jul. 20, 2022

(65) Prior Publication Data
US 2023/0324544 A1    Oct. 12, 2023

(30) Foreign Application Priority Data
Apr. 6, 2022  (KR) .................. 10-2022-0042673

(51) Int. Cl.
*G01S 13/931*    (2020.01)
*G01S 7/02*    (2006.01)

(52) U.S. Cl.
CPC ............ *G01S 13/931* (2013.01); *G01S 7/023* (2013.01)

(58) Field of Classification Search
None
See application file for complete search history.

(56) References Cited

U.S. PATENT DOCUMENTS

| | | | |
|---|---|---|---|
| 2019/0049555 A1* | 2/2019 | Sreekiran | H01Q 1/3233 |
| 2020/0132811 A1* | 4/2020 | Goswami | G01S 7/40 |

FOREIGN PATENT DOCUMENTS

| | | |
|---|---|---|
| JP | 10-54874 A | 2/1998 |
| JP | 10-206531 A | 8/1998 |
| KR | 10-2020-0076735 A | 6/2020 |
| KR | 10-2020-0124838 A | 11/2020 |

OTHER PUBLICATIONS

KR100267847 translation (Year: 2000).*

* cited by examiner

*Primary Examiner* — Whitney Moore
(74) *Attorney, Agent, or Firm* — Hauptman Ham, LLP

(57) ABSTRACT

The method for controlling a radar device of a vehicle according to an exemplary embodiment of the present invention includes the steps of transmitting a radar signal through a plurality of transmitting antennas included in an antenna part and formed of array antennas; receiving a reflected signal where the radar signal is reflected from a target through a plurality of receiving antennas comprised in the antenna part and formed of array antennas; converting a phase of a local oscillation signal based on phase information provided to disperse an incoming noise signal; generating a mixed signal of the reflected signal and the phase-transformed local oscillation signal; and correcting a phase of the noise signal based on the phase information.

12 Claims, 7 Drawing Sheets

RADAR DEVICE FOR VEHICLE AND CONTROL METHOD THEREOF

CROSS-REFERENCE TO RELATED APPLICATION

This application claims priority to and the benefit of Korean Patent Application No. 10-2022-0042673, filed on Apr. 6, 2022, the disclosure of which is incorporated herein by reference in its entirety.

TECHNICAL FIELD

The present invention relates to a radar device for a vehicle and a control method thereof.

BACKGROUND ART

Although the internal configuration of a radar system has become complicated, an increase in the module size of the radar system is inevitably limited in consideration of mounting in a vehicle environment. In order to overcome this limitation, a high degree of integration of the radar system has been pursued.

As the degree of integration of the radar system has been increased, there is a high possibility that a noise signal generated from a power source or an electronic component is introduced into a radar signal, if a noise signal is introduced, the noise signal may generate a specific frequency component, and the radar device of a vehicle may misrecognize the specific frequency component as a target.

In particular, an autonomous vehicle in which the advanced driver assistance system (AAS) is implemented may misrecognize a noise signal as a target and perform emergency braking or the like.

Although various attempts have been made to adjust the periodicity of a noise signal through the hardware design of a radar device, it is difficult to adjust all noise signals only by a hardware design, such as generating a different periodicity differently from an intention, rather amplifying a noise signal or experimentally proving a noise signal component to be controlled. In addition, there is still a problem in that noise signals other than controlled noise signals are vulnerable.

DISCLOSURE

Technical Problem

An object of the present invention is to provide a radar device for a vehicle, which is capable of intentionally reducing the risk of misrecognizing a noise signal as a target, and a control method thereof.

Another object of the present invention is to provide a radar device for a vehicle for more efficiently reducing the periodicity of a noise signal, and a control method thereof.

Technical Solution

The radar device for a vehicle according to an exemplary embodiment of the present invention includes an antenna part including a plurality of transmitting antennas and a plurality of receiving antennas, the antenna part being formed of array antennas; a transmitter for transmitting a radar signal through the plurality of transmitting antennas; a receiver for receiving a reflected signal where the radar signal is reflected from a target by the radar signal through the plurality of receiving antennas; a phase converter for converting a phase of a local oscillation signal transmitted from the transmitter to the receiver; and a signal processor for controlling the transmitter and the receiver so as to transmit the radar signal and receive the reflected signal through the antenna part, controlling the phase converter to convert the phase of the local oscillation signal based on phase information provided to disperse an incoming noise signal, receiving a mixed signal of the reflected signal and the phase-converted local oscillation signal, and correcting a phase of the noise signal based on the phase information.

The signal processor may correct a phase of the mixed signal based on the phase information, and detect the target based on the corrected mixed signal.

The signal processor may correct a phase of the noise signal for each channel based on the phase information.

The signal processor may control the transmitter so as to transmit the radar signal in the form of a plurality of chirps through each transmitting antenna of the plurality of transmitting antennas.

The signal processor may control the phase converter such that a plurality of the local oscillation signals corresponding to the radar signal in the form of the plurality of chirps have different phases based on the phase information, and corrects the phase of the noise signal based on the different phases.

The transmitter may further include an oscillator for generating the local oscillation signal.

The signal processor may receive a mixed signal obtained by differentiating the reflected signal and the phase-converted local oscillation signal.

The method for controlling a radar device of a vehicle according to an exemplary embodiment of the present invention includes the steps of transmitting a radar signal through a plurality of transmitting antennas included in an antenna part and formed of array antennas; receiving a reflected signal where the radar signal is reflected from a target through a plurality of receiving antennas comprised in the antenna part and formed of array antennas; converting a phase of a local oscillation signal based on phase information provided to disperse an incoming noise signal; generating a mixed signal of the reflected signal and the phase-transformed local oscillation signal; and correcting a phase of the noise signal based on the phase information.

The method may further include the steps of correcting a phase of the mixed signal based on the phase information; and detecting the target based on the corrected mixed signal.

The step of correcting a phase of the noise signal may include correcting a phase of the noise signal for each channel based on the phase information.

The step of transmitting the radar signal may include transmitting the radar signal in the form of a plurality of chirps through each transmitting antenna of the plurality of transmitting antennas.

The step of converting the phase of the local oscillation signal comprises converting phases of a plurality of the local oscillation signals such that the plurality of the local oscillation signals corresponding to the radar signal in the form of the plurality of chirps have different phases from each other based on the phase information, and wherein the step of correcting the phase of the noise signal comprises correcting the phase of the noise signal based on the different phases.

The step of transmitting the radar signal may further include generating the local oscillation signal.

The step of generating the mixed signal may include generating the mixed signal by differentiating the reflected signal and the phase-transformed local oscillation signal.

Advantageous Effects

According to an exemplary embodiment of the present invention, the influence on signal processing of a noise signal is reduced, and the risk of being detected as a false target or interfering with the detection of a target signal is reduced.

According to an exemplary embodiment of the present invention, the detection probability may be lowered for a noise signal, and the normal detection probability may be maintained for a reflected signal according to an intentional matching mismatch of the noise signal by using the signal characteristics according to chirps.

According to an exemplary embodiment of the present invention, the reliability of signal detection may be further increased by using matching characteristics.

MODES OF THE INDENTION

Figure 1:
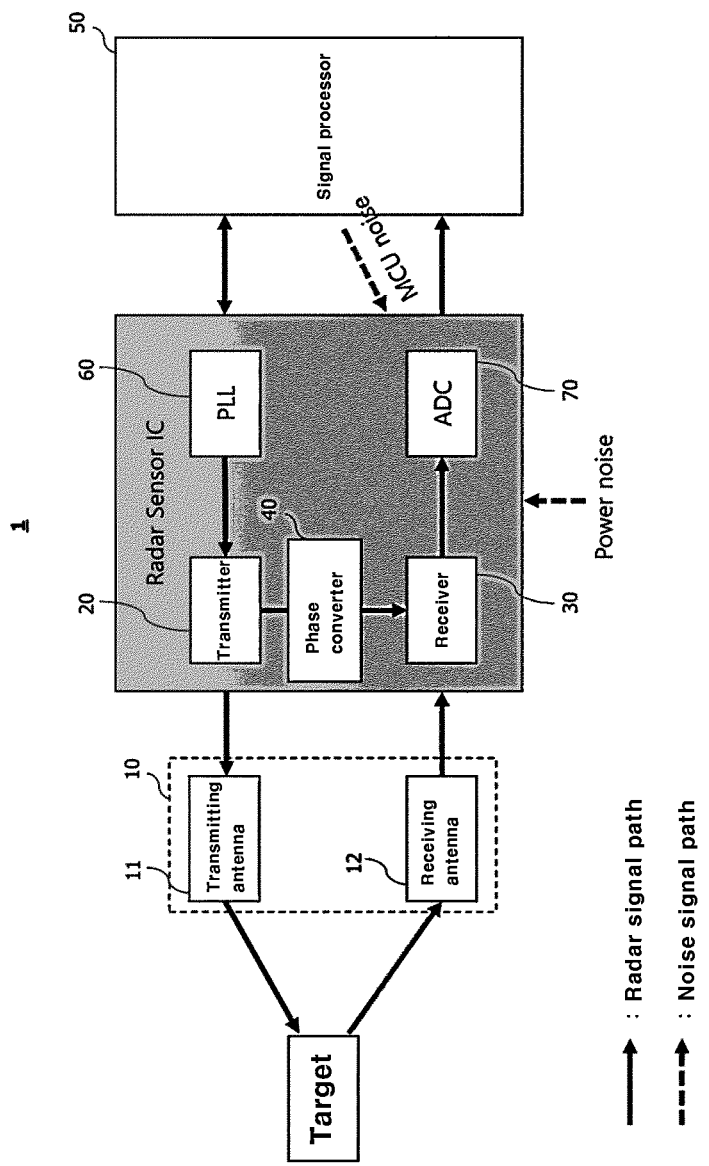
FIG. 1 is a block diagram illustrating the configuration of a radar device for a vehicle according to an exemplary embodiment of the present invention.

Hereinafter, preferred exemplary embodiments according to the present invention will be described in detail with reference to the accompanying drawings. The detailed description set forth below in conjunction with the appended drawings is intended to describe exemplary embodiments of the present invention and is not intended to represent the only exemplary embodiments in which the present invention may be practiced. In order to clearly describe the present invention in the drawings, parts that are not relevant to the description may be omitted, and the same reference numerals may be used for the same or similar components throughout the specification.

FIG. 1 is a block diagram illustrating the configuration of a radar device for a vehicle according to an exemplary embodiment of the present invention.

Referring to FIG. 1, the radar device for a vehicle 1 (hereinafter, referred to as a radar device 1) according to an exemplary embodiment of the present invention may include an antenna part 10, a transmitter 20, a receiver 30, and a phase converter 40, a signal processor 50, a phase locked loop (PLL) 60 and an analog-digital converter (ADC) 70.

According to an exemplary embodiment of the present invention, the vehicle on which the radar device 1 is mounted is not limited to any one such as a car, a motorcycle or the like, and the radar device 1 may be installed in the front, rear or side of the vehicle, and the installation thereof not limited to location.

According to an exemplary embodiment of the present invention, the antenna part 10 includes a plurality of transmitting antennas 11 and a plurality of receiving antennas 12, and the antenna part is formed of array antennas. In this case, the antenna part 10 may be implemented by being disposed on a PCB substrate.

The transmitter 20, the receiver 30, the PLL 60 and the ADC 70 may be implemented together as a radar sensor IC, but the arrangement structure or configuration thereof is not limited thereto.

According to an exemplary embodiment of the present invention, the transmitter 20 transmits a radar signal through a plurality of transmitting antennas 11. In this case, the radar signal is transmitted in the form of a plurality of chirps (compressed high-intensity radiated pulse) through each transmitting antenna. The more detailed description of the chirp will be described with reference to FIG. 3.

Although not illustrated in FIG. 1, the transmitter 20 may further include an oscillator such as a local oscillator for generating a radar signal.

According to an exemplary embodiment of the present invention, the receiver 30 receives a reflected signal where the radar signal is reflected from a target through a plurality of receiving antennas 12. In this case, a plurality of reflected signals corresponding to the radar signals transmitted in the form of a plurality of chirps are received.

The receiver 30 may receive a local oscillation signal oscillated when the transmitter 20 generates a radar signal in addition to the reflected signal. In this case, since the local oscillation signal is generated whenever the transmitter 20 transmits a radar signal in the form of a chirp, it means a plurality of local oscillation signals corresponding to the radar signal in the form of a plurality of chirps.

In addition, although not illustrated in FIG. 1, the receiver 30 may further include a low noise amplifier (LNA) for low-noise amplifying the reflected signal received through the receiving antenna 12, a mixer for mixing the low-noise amplified reflected signal, and an amplifier for amplifying the mixed reflected signal. In this case, the ADC 70 digitally converts the amplified reflected signal to generate received data, and transmits the same to the signal processor 50.

According to an exemplary embodiment of the present invention, a plurality of reflected signals may form a mixed signal through a mixer with a plurality of local oscillation signals.

According to an exemplary embodiment of the present invention, the phase converter 40 converts the phase of a local oscillation signal transmitted from the transmitter 20 to the receiver 30. According to an exemplary embodiment of the present invention, the phase shift of the phase converter 40 may be controlled by the signal processor 50.

Meanwhile, according to an exemplary embodiment of the present invention, whereas the radar signal moves along a predetermined path as described above, the noise signal generated inside the radar device 1 is directly introduced into the ADC 70 or the radar sensor circuit. The noise signal means noise coming from an electronic product such as a power supply unit or a signal processor 50 adjacent to the radar sensor circuit according to a highly integrated design of the radar device 1. According to an exemplary embodiment of the present invention, as the paths of the radar signal and the noise signal are different from each other, the signal processor 50 may distinguish and respond thereto.

When a noise signal is entered into the radar device 1, there is a case where it is recognized as a so-called false target in which it is recognized that there is a target even though there is no target due to similar characteristics between the noise signals.

According to an exemplary embodiment of the present invention, the phase conversion of the local oscillation signal may be performed in advance in order to reduce the possibility of detecting a false target. In this regard, more detailed information will be described with reference to FIGS. 5 to 7.

According to an exemplary embodiment of the present invention, the signal processor 50 may be a micro control unit (MCU) or a microprocessor, and performs an overall operation of controlling the radar device 1.

When the signal processor 50 transmits a control command to the radar sensor circuit, a radar signal corresponding to the control command is generated through the PLL 60 and the transmitter 20 and transmitted to the transmitting antenna 11. In this case, the PLL 60 is a system that controls an output signal by using the phase difference between an input signal and a signal fed back from the output signal, and performs frequency adjustment of the output signal according to the signal input from the signal processor 50.

The radar signal transmitted through the transmitting antenna 11 is reflected by the target and transmitted to the receiving antenna 12. The receiver 30 receives the reflected signal through the receiving antenna 12 and transmits it to the ADC 70. The ADC 70 converts the reflected signal back into a digital signal and transmits it to the signal processor 50. The signal processor 50 may identify target information such as a position, an angle and a distance of the target by using the received signal.

According to an exemplary embodiment of the present invention, the signal processor 50 processes the radar signal and the reflected signal that are transmitted/received through the antenna part 10 to identify target information such as the location and distance of the target.

According to an exemplary embodiment of the present invention, the signal processor 20 may transmit a radar signal in a specific operating frequency band through a plurality of transmitting antennas 11, and receive a reflected signal that is returned after the radar signal hits a target through a plurality of receiving antennas 12.

According to an exemplary embodiment of the present invention, in order for the signal processor 50 to analyze an incoming signal to detect a target, the process of re-correcting the phase converted by the phase converter 40 is required. Since this can also be applied to the noise signal entered into the radar device 1, when the phase correction value included in the phase information is appropriately adjusted, the phase of the noise signal may be adjusted together. A noise signal may be recognized as a false target due to similar characteristics and may interfere with a target to be found, or it may be difficult to recognize as a noise signal in signal processing due to its uniformity. Accordingly, in the present invention, the periodicity of a noise signal may be eliminated or reduced by making each noise signal have a different phase correction value.

In addition to the above, although not illustrated in FIG. 1, the radar device 10 may further include a feeding part having a feeding line for connecting the antenna part 10 and the signal processor 20, and the feeding line may be provided in plurality to respectively connect a plurality of transmitting antennas 11 and a plurality of receiving antennas 12 with the signal processor 20.

Hereinafter, the process of adjusting the periodicity of a noise signal will be described in detail in the present invention.

Figure 2:
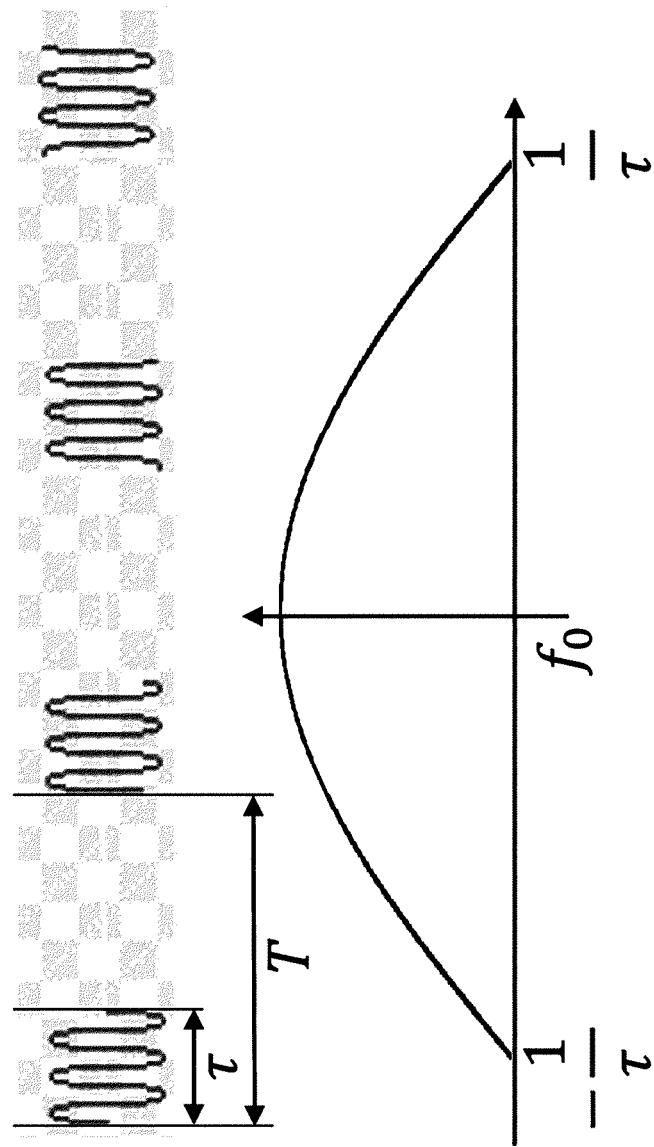
FIG. 2 is a diagram illustrating the coherent state of a radar signal according to an exemplary embodiment of the present invention.

FIG. 2 is a diagram illustrating the coherent state of a radar signal according to an exemplary embodiment of the present invention.

FIG. 2 includes a plurality of waveforms (chirps) transmitted with the same length ($\tau$) at a predetermined period (T), and a graph showing the frequency characteristics of the waveforms. The matching method is a method of transmitting the same initial phase of a waveform starting every cycle.

Through this, when the transmitted waveform returns, not only the frequency but also the phase of the waveform may be valid information, and information between the waveforms may be extracted.

According to an exemplary embodiment of the present invention, all chirps are transmitted in the same phase, thereby increasing the reliability of speed identification later.

Figure 3:
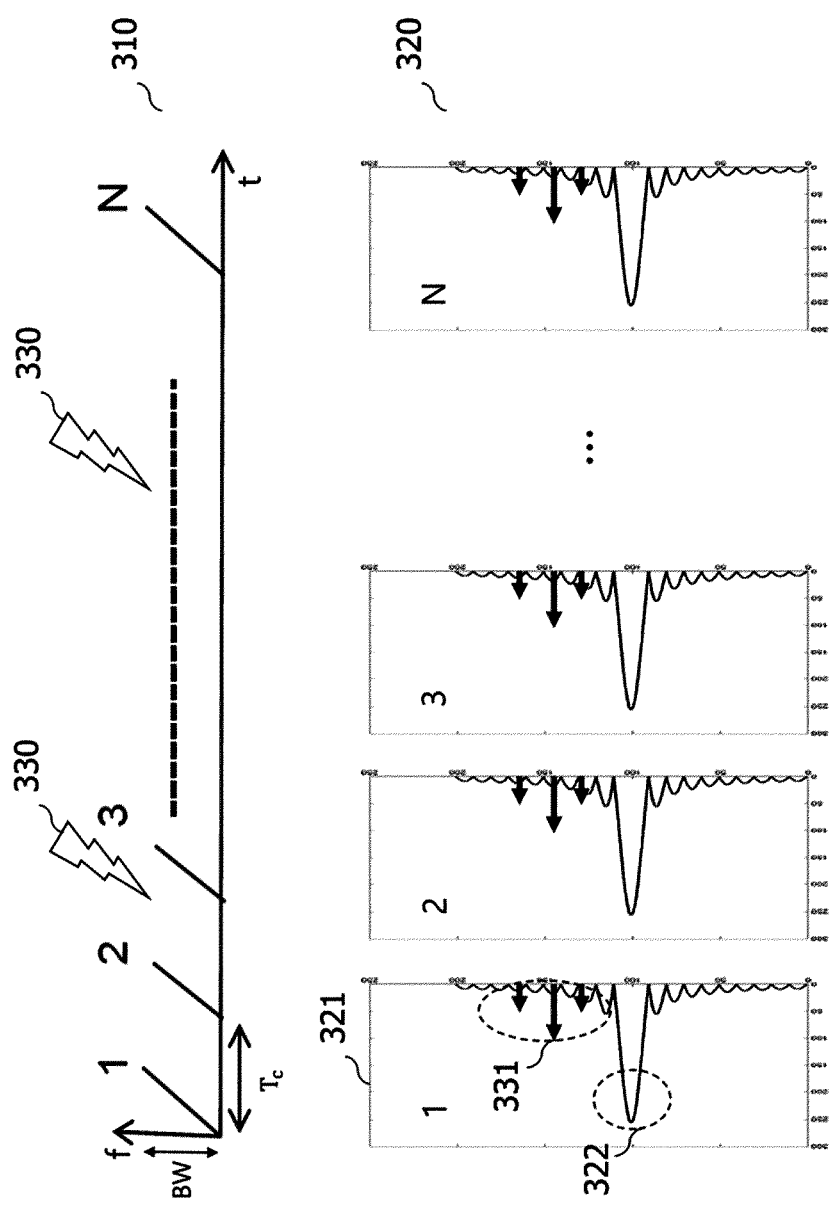
FIG. 3 is a diagram illustrating a state in which noise is entered into a radar device according to an exemplary embodiment of the present invention.

FIG. 3 is a diagram illustrating a state in which noise is entered into a radar device according to an exemplary embodiment of the present invention.

FIG. 3 illustrates N chirps 310 transmitted with a period of Tc and a bandwidth of BW from the transmitter, and a reflected signal 320 that is reflected by hitting a target for each chirp.

According to an exemplary embodiment of the present invention, the transmitter 20 may generate a very high frequency signal in the form of a frequency modulation continuous wave (FMCW) under the control of the signal processor 50. The very high frequency signal according to an exemplary embodiment of the present invention may be a chirp-type radar signal. Most signals have an amplitude (A) that changes with time, but chirp means a signal whose frequency changes with time. In this case, since the chirp uses a bandwidth, a chirp time and a slope using the same as parameters, the amount of change in the frequency may be determined according to the time the signal is transmitted and returned.

Fast chirp means to collect and transmit a plurality of similar chirps at the same time in order to more reliably measure the amount of change in frequency indicated by the chirp. Accordingly, the signal processor 50 may identify the speed and movement of a target according to the time between a plurality of chirps and the number of chirps.

As described above, the radar device 1 transmits a radar signal in the form of a plurality of chirps, and in particular, when the transmitted chirps are matched as described above with reference to FIG. 2, the reliability of target detection may be higher.

On the other hand, the noise signal 330 entered into the radar device 1 contaminates the reflected signal. In this case, the noise signal 330 has a high probability that similar signals are continuously entered into all channels and chirps due to their characteristics.

More specifically, looking at a reflected signal 321 corresponding to a first chirp, it can be seen that, in addition to the largest peak characteristic 322 corresponding to a target, a noise signal characteristic 331 appears, and it can be seen that the noise signal has similar characteristics from the reflected signal corresponding to the first chirp to the reflected signal corresponding to the $N^{th}$ chirp. This can be confirmed more clearly in FIG. 4.

Figure 4:
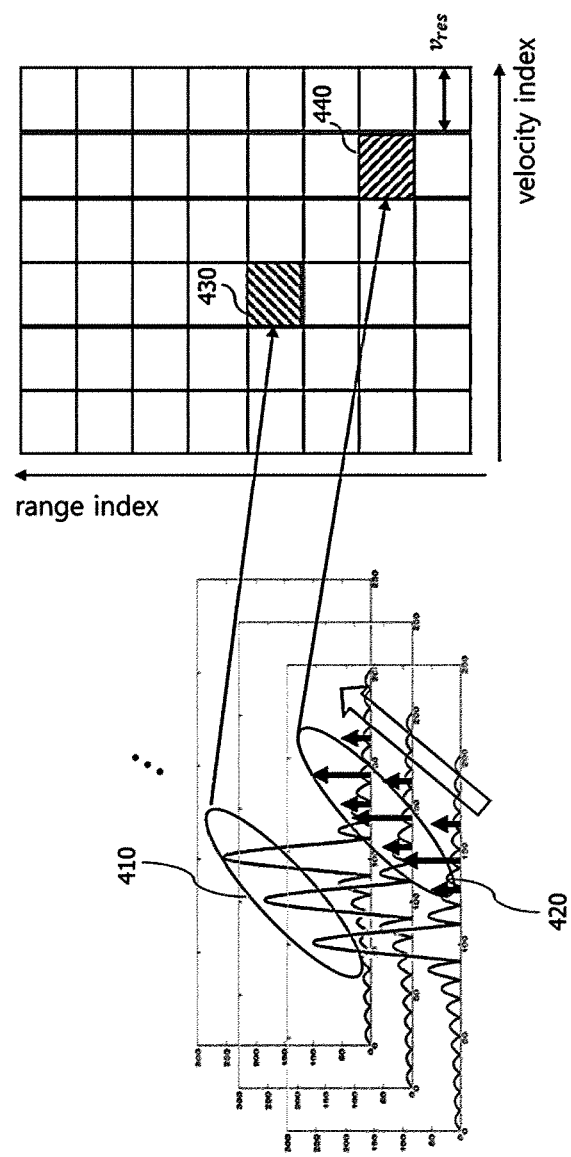
FIG. 4 is a diagram illustrating a state in which noise is entered into a radar device according to an exemplary embodiment of the present invention to have similar noise characteristics.

FIG. 4 is a diagram illustrating a state in which noise is entered into a radar device according to an exemplary embodiment of the present invention to have similar noise characteristics.

The reflected signal illustrated in FIG. 4 is the same as that illustrated in FIG. 3. Referring to FIG. 4, it can be seen that not only the target characteristics 410 of the reflected signal appear similarly in a plurality of reflected signals, but also the noise characteristics 420 of the noise signal entered into the radar device 1 similarly appear. These target characteristics 410 and noise characteristics 420 may be respectively indicated by specific points 430, 440 in the relationship between the velocity index and the frequency index.

If the signal processor 50 receives and processes these without a separate correction process, the noise characteristics 420 may also be recognized as a target or may have various effects such as reducing the actual target characteristics 410.

In order to solve this problem, the present invention proposes a method of performing phase correction such that the noise characteristics 420 illustrated in FIG. 4 are dispersed and recognized as meaningless signals.

Figure 5:
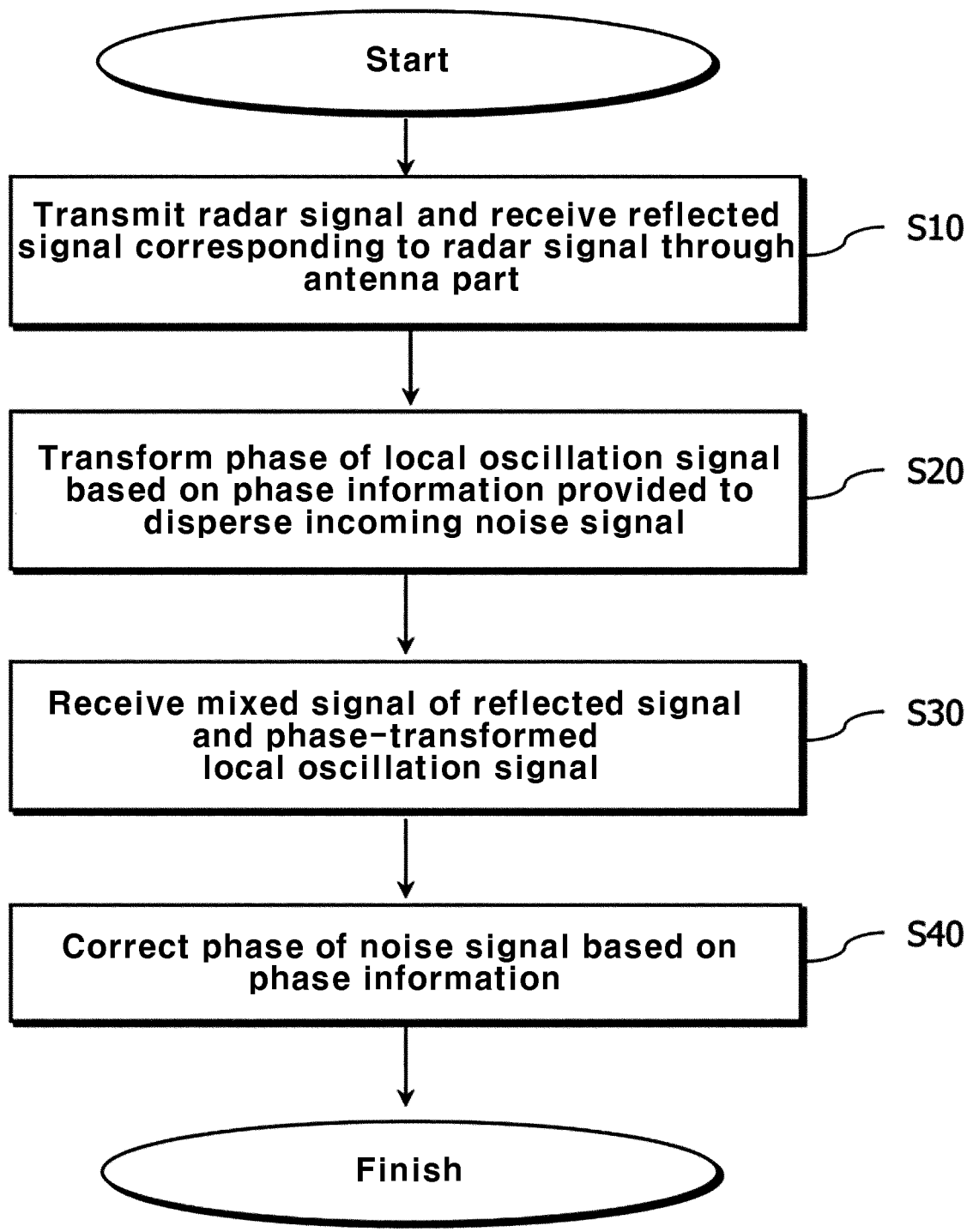
FIG. 5 is a flowchart illustrating the operation of a radar device according to an exemplary embodiment of the present invention.

FIG. 5 is a flowchart illustrating the operation of a radar device according to an exemplary embodiment of the present invention.

According to an exemplary embodiment of the present invention, the signal processor 50 transmits a radar signal through the antenna part 10 and controls the transmitter 20 and the receiver 30 so as to receive a reflected signal corresponding to the radar signal, respectively.

According to an exemplary embodiment of the present invention, the antenna part 1 is formed of array antennas including a plurality of transmitting antennas 11 and a plurality of receiving antennas 12, and formed with a channel that may process a reflected signal received for each receiving antenna 12.

As described above with reference to FIG. 3, the radar device 1 of the present invention is an FMCW radar device, and the signal processor 50 may control the transmitter 20 so as to transmit a radar signal in the form of a plurality of chirps through each transmitting antenna of the plurality of transmitting antennas 11.

According to an exemplary embodiment of the present invention, the signal processor 50 may convert the phase of a local oscillation signal based on phase information provided to disperse an incoming noise signal (S20).

Phase information according to an exemplary embodiment of the present invention means information including a phase correction value for converting the phase of a local oscillation signal and then correcting the phases of a plurality of noise signals similarly entered into the radar device 1.

The reason for pre-converting the phase of a local oscillation signal in this step is that when the phase of a noise signal is corrected to disperse the noise signal in S40, which will be described below, the phase of the actual target signal, that is, the reflected signal is also corrected such that the reflected signal is not affected.

In this case, the phase correction value preferably has an arbitrary random value so as to disperse the noise signal, and the phase information is prepared and stored in the signal processor 50 in advance, or the signal processor 50 may identify the same according to the situation, and the present invention is not limited to any one thereof.

The signal processor 50 may control the phase converter 40 such that a plurality of local oscillation signals corresponding to a radar signal in the form of a plurality of chirps have different phases from each other based on the phase information.

According to an exemplary embodiment of the present invention, the signal processor 50 may receive a mixed signal of the reflected signal and the phase-converted local oscillation signal (S30).

According to an exemplary embodiment of the present invention, the signal processor 50 may control the mixer such that a plurality of reflected signals generate a mixed signal by mixing a plurality of phase-converted local oscillation signals. In this case, the plurality of reflected signals may be differentiated from and mixed with the plurality of phase-converted local oscillation signals.

According to an exemplary embodiment of the present invention, the signal processor 50 may correct the phase of a noise signal based on phase information (S40).

As described above in S10, since a channel is formed for each receiving antenna, the signal processor 50 may correct the phase of a noise signal for each channel based on phase information.

Accordingly, it is possible to not only correct the phase of a noise signal for a single channel, but also perform the same for each channel to reduce the signal characteristics of the entire noise signal.

The signal processor 50 may correct the phase of a mixed signal based on the phase information and detect a target based on the corrected mixed signal. That is, the signal processor 50 restores the signal by the phase adjusted by the phase converter 40. For this reason, the reflected signal included in the mixed signal is not affected by the correction of the noise signal, and the signal processor 50 may effectively detect a target based on the reflected signal.

According to an exemplary embodiment of the present invention, the intentional coherent miss-match of a noise signal is used by using signal characteristics according to chirps. Accordingly, it is possible to lower the detection probability for the noise signal and maintain the normal detection probability for the reflected signal.

Figure 6:
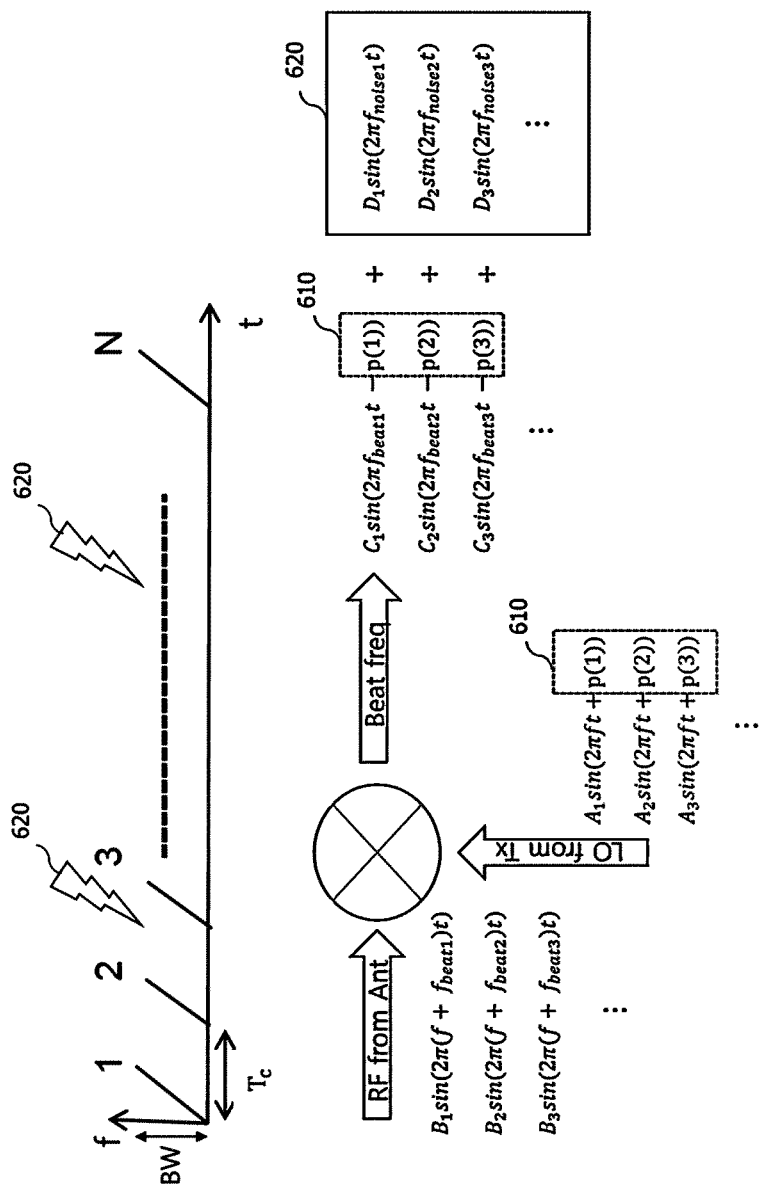
FIG. 6 is a diagram illustrating the phase conversion of a radar device according to an exemplary embodiment of the present invention.

FIG. 6 is a diagram illustrating the phase conversion of a radar device according to an exemplary embodiment of the present invention.

FIG. 6 describes a detailed example of the process of generating a mixed signal of a reflected signal and a phase-converted local oscillation signal as described in S10 to S30 of FIG. 5.

Referring to FIG. 6, there are N chirps (1, 2, 3, . . . , N) having a chirp period of Tc and a bandwidth of BW. The reflected signal (RF from Ant) corresponding to each chirp (1, 2, 3, . . . , N) is mixed with a phase-converted local oscillation signal (LO from Tx) coming from an oscillator of the transmitter 20 by the mixer to become a mixed signal (Beat freq). In this case, although there may be a unique phase of the reflected signal or the local oscillation signal, the phase of each signal is assumed to be 0 degrees in this drawing for the convenience of explanation.

According to an exemplary embodiment of the present invention, the reflected signal has a waveform of $B_n \sin(2\pi (f+f_{beam})t)$. In this case, f is the transmission frequency, and $f_{beam}$ is the frequency of the target.

According to an exemplary embodiment of the present invention, the local oscillation signal has a waveform of $A_n \sin(2\pi ft)$, and the phase is converted by the phase information 610 to have the form of $A_n \sin(2\pi ft)+p(n)$. In this case, p(1), p(2), p(3) and the like that are included in the phase information 610 may be arbitrary values as different values.

The mixed signal (Beat freq) is obtained by differentiating between the reflected signal (RF from Ant) and the phase-converted local oscillation signal (LO from Tx) by the mixer. Accordingly, according to an exemplary embodiment of the present invention, the mixed signal has a waveform of $C_n \sin(2\pi f_{beam}t-p(n))$.

In this case, when the noise signal 620 is entered into the radar device 1, as a result, the signal processor 50 receives a signal in which the mixed signal and the noise signal are mixed.

Since the noise signal has a waveform of $D_n \sin(2\pi f_{noisen}t)$, the entire signal has a waveform of $C_n \sin(2\pi f_{beam}t-p(n))+D_n \sin(2\pi f_{noisen}t)$. In this case, $f_{noisen}$ is the frequency of the noise signal.

Hereinafter, the state in which the signal processor 50 disperses the noise characteristics of a noise signal will be described with reference to FIG. 7.

Figure 7:
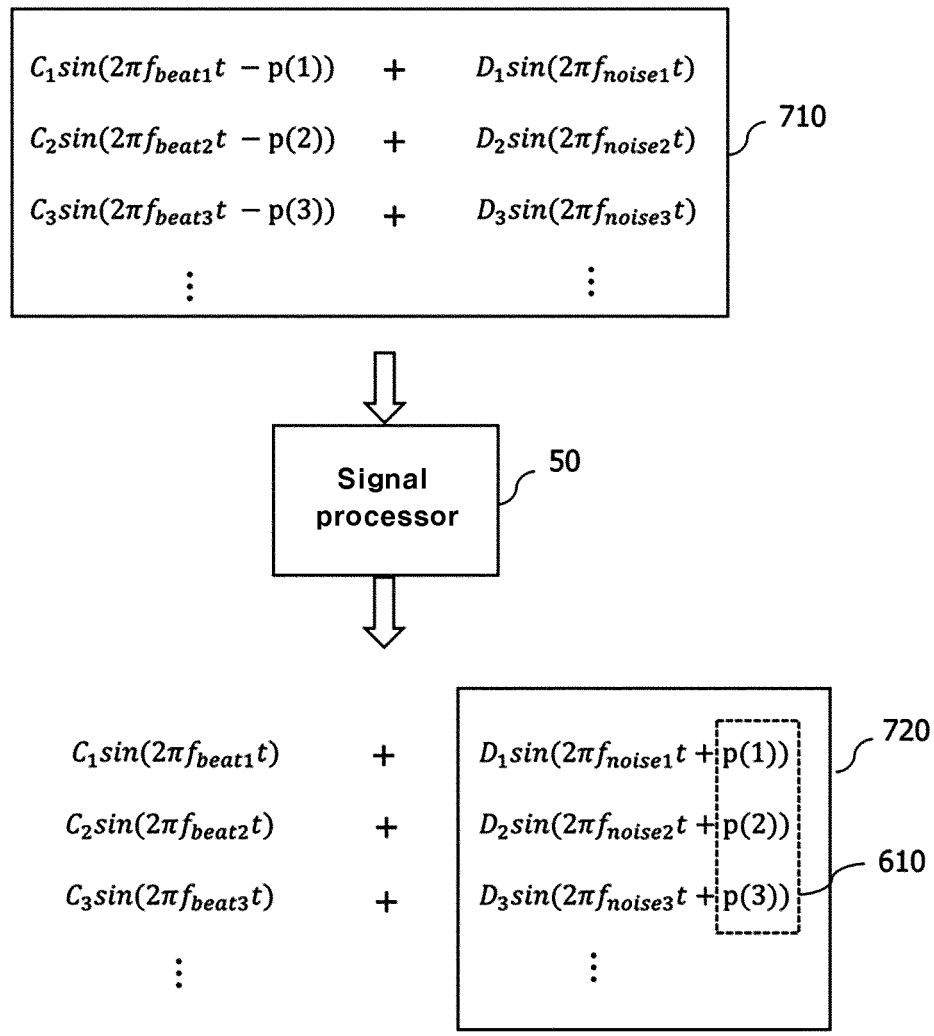
FIG. 7 is a diagram illustrating the phase correction of a radar device according to an exemplary embodiment of the present invention.

FIG. 7 is a diagram illustrating the phase correction of a radar device according to an exemplary embodiment of the present invention.

FIG. 7 describes a detailed example of the process of correcting the phase of a noise signal based on the phase information as described in S40 of FIG. 5.

In the same situation as in FIG. 6, the signal processor 50 receives the entire signal 710 in which the mixed signal and the noise signal are mixed.

According to an exemplary embodiment of the present invention, the signal processor 50 may correct the phases of the mixed signal and the noise signal based on the phase information.

Referring to FIG. 7, the noise signal has a waveform of $D_n \sin(2\pi f_{noisen}t)$, but after correction according to phase information, it has a waveform of $D_n \sin(2\pi f_{noisen}t+p(n))$. In this case, as described above, since the phase information 610 p(n) has different arbitrary values for each signal, similar noise characteristics between the noise signals 720 disappear after phase correction. Accordingly, as the phase of the noise signal is adjusted, the influence on signal processing of a noise signal is reduced, and the risk of being detected as a false target or interfering with the detection of a target signal is reduced.

On the other hand, the mixed signal has a waveform of $C_n \sin(2\pi f_{beam}t-p(n))$, but the phase is also corrected by p(n) according to the correction of the noise signal. Therefore, the mixed signal has a waveform of $C_n \sin(2\pi f_{beam}t)$ after correction such that only a pure reflected signal remains. That is, the reflected signal included in the mixed signal is not affected by the correction of the noise signal, and the signal processor 50 may effectively detect the target based on the reflected signal.

EXPLANATION OF REFERENCE NUMERALS

1: Radar device
10: Antenna part
20: Transmitter
30: Receiver
40: Phase converter
50: Signal processor
60: Phase locked circuit
70: Converter

The invention claimed is:

1. A radar device for a vehicle, comprising:
an antenna part comprising a plurality of transmitting antennas and a plurality of receiving antennas, the antenna part being formed of array antennas;
a transmitter configured to transmit radar signals through the plurality of transmitting antennas, each radar signal being transmitted at a different time according to a predetermined period;
a phase converter configured to convert phases of local oscillation signals transmitted from the transmitter to the receiver, such that the phases of the local oscillation signals are converted to arbitrary values and each phase is different from others, the local oscillation signals being generated at different times according to the predetermined period;
a receiver configured to receive reflected signals through the plurality of receiving antennas and the phase-converted local oscillation signals to provide mixed signals to a signal processor, the mixed signals being obtained by differentiating between the reflected signals and the phase-converted local oscillation signals; and
the signal processor configured to:
receive the mixed signals; and
convert each phase of each mixed signal by the amount corresponding to the converted phase value of each local oscillation signal.

2. The radar device of claim 1, wherein the signal processor configured to identify a target based on the converted mixed signals.

3. The radar device of claim 1, wherein each phase of the phase-converted local oscillation signals, generated at a same period, is different for each channel.

4. The radar device of claim 1, wherein the signal processor controls the transmitter so as to transmit the radar signal in the form of a plurality of chirps through each transmitting antenna of the plurality of transmitting antennas.

5. The radar device of claim 1, wherein the degree of integration of the radar device is such that a noise signal is likely to be included in the mixed signal before the mixed signal is provided to the signal processor.

6. The radar device of claim 1, wherein the transmitter further comprises an oscillator for generating the local oscillation signal.

7. A method for controlling a radar device of a vehicle, comprising:
transmitting radar signals through a plurality of transmitting antennas comprised in an antenna part and formed of array antennas;
converting phases of local oscillation signals transmitted from a transmitter to a receiver, such that the phases of the local oscillation signals are converted to arbitrary values and each phase is different from the others, the local oscillation signals being generated at different times according to the predetermined period;
receiving reflected signals through a plurality of receiving antennas and the phase-converted local oscillation signals to provide mixed signals, the mixed signals being obtained by differentiating between the reflected signals and the phase-converted local oscillation signals; and
converting each phase of each mixed signal by the amount corresponding to the converted phase value of each local oscillation signal.

8. The method of claim 7, further comprising:
identifying a target based on the converted mixed signals.

9. The method of claim 7, wherein each phase of the phase-converted local oscillation signals, generated at a same period, is different for each channel.

10. The method of claim 7, wherein the step of transmitting the radar signal comprises transmitting the radar signal in the form of a plurality of chirps through each transmitting antenna of the plurality of transmitting antennas.

11. The method of claim 10, wherein a noise signal is likely to be included in the mixed signal before the mixed signal is provided.

12. The method of claim 7, further comprising:
generating the local oscillation signals.

* * * * *